(12) United States Patent
Liu

(10) Patent No.: US 6,739,765 B1
(45) Date of Patent: May 25, 2004

(54) SOCKET FOR OPTICAL FIBER CONNECTOR

(75) Inventor: Richard Liu, Taoyuan Hsien (TW)

(73) Assignee: Simula Co., Ltd., Taoyuan Hsien (TW)

( * ) Notice: Subject to any disclaimer, the term of this patent is extended or adjusted under 35 U.S.C. 154(b) by 0 days.

(21) Appl. No.: 10/418,263

(22) Filed: Apr. 18, 2003

(51) Int. Cl.[7] .............................................. G02B 6/36
(52) U.S. Cl. ............................ 385/92; 385/88; 385/89
(58) Field of Search ............................. 385/88, 89, 92

(56) References Cited

U.S. PATENT DOCUMENTS

| | | | | |
|---|---|---|---|---|
| 5,577,146 A | * | 11/1996 | Musk | 385/92 |
| 6,352,375 B1 | * | 3/2002 | Shimoji et al. | 385/92 |
| 6,450,703 B1 | * | 9/2002 | Shirakawa | 385/92 |
| 6,497,518 B1 | * | 12/2002 | Deane | 385/92 |
| 6,644,868 B2 | * | 11/2003 | De Marchi | 385/88 |

* cited by examiner

Primary Examiner—Phan T. H. Palmer
Assistant Examiner—Jennifer Doan
(74) Attorney, Agent, or Firm—Rabin & Berdo, P.C.

(57) ABSTRACT

A socket for optical fiber connector used in data transmission of video display systems, at least includes a plastic housing and a light receiving and emitting element. The features thereof are that in the plastic housing is provided with a modularized protective hood further comprising a front cover having a rectangular recess and a movable door pivotally disposed at two inner sides thereof, respectively, for coordinating with bases having different structures, so as to satisfy requirements of various vendors in manufacturing and assembly, thereby accomplishing effects as having easy assembly, minimizing volume of plastic housings and lowering production cost.

10 Claims, 8 Drawing Sheets

US 6,739,765 B1

SOCKET FOR OPTICAL FIBER CONNECTOR

BACKGROUND OF THE INVENTION (a) Field of the Invention

The invention relates to a socket for optical fiber connector, and more particularly, to a socket for optical fiber connector used in signal transmission of video displays and having a protective hood capable of opening and automatically closing at an opening thereof, wherein the protective hood is modularized for accommodating usages of variously designed bases and assemblies, thereby achieving effects as having easy assembly, minimizing volumes of plastic housings and lowering production cost.

(b) Description of the Prior Art

Referring to FIG. 7 showing a conventional socket for optical fiber connector, the prior art comprises a socket plastic housing a and a light receiving and emitting element b disposed in the plastic housing a. In the front of the plastic housing a is provided with a pentagonal opening c for inserting a plug of an optical fiber (this is a prior art and shall not be further described), so as to accomplish data transmissions of video display.

According to the aforesaid structure, a shortcoming thereof is that signal transmissions thereof are inevitably affected should a lens b1 of the light receiving and emitting element b is contaminated. It is then necessary to protect the lens b1 from any possible contaminations all the way from production, installation and application of the optical fiber connector. Therefore, industrialists have added a movable door d at the opening c at the front of the plastic housing a as indicated in FIG. 8. Referring to FIG. 8 showing such prior socket for optical fiber connector, the disadvantage thereof is that the volume of the plastic housing is subsequently multiplied for that the shape and size of the pentagonal opening c at the front of the plastic housing a is a common standard used in the industry and is invariable. Hence additional provision of a movable door that opens inwardly at this standardized opening naturally increases the structural thickness of the movable door d, and the plastic housing having an enlarged size may then become unsuitable in existing computer equipment. Above all, modern computer equipment are all developed for aiming at being small in size and light in weight, and thus requirements of present needs are contradicted if any of the computer parts are larger than they used to be; such elements not only lack practicability but also innovative perspectives. Therefore, it is a vital task as how to make advancements for overcoming the disadvantages of the prior arts shown in FIGS. 7 and 8.

SUMMARY OF THE INVENTION

In the view of the shortcomings of prior sockets for optical fiber connectors, the primary object of the invention is to provide a socket for optical fiber connector comprising a protective hood designed in coordination with a base and a light receiving and emitting element thereof. The protective hood is a modularized structure for accomplishing effects as having easy assembly, minimizing volume of plastic housings and lowering production cost.

To accomplish the above object, the invention comprises a modularized protective hood in a plastic housing thereof, wherein the modularized protective hood further comprises a rectangular front cover, and a movable door pivotally disposed at two sides of the interior thereof, respectively. Length and width of the front cover are less than those of common plastic housings. At a front panel of the front cover is provided with a standardized opening, a protruding portion is disposed at upper and lower positions approaching front edges of two side panels of the front cover, respectively, such that each of the protruding portions forms an axis mount, and an outwardly projecting interlocking portion is provided at a rear end of the two side panels, respectively. The plastic housing further comprises a movable door disposed with a short axis at upper and lower edges thereof, respectively, wherein between short axes is accommodated with a spring, respectively, and at the center of the breadth of the movable door is transversely disposed with a groove, such that the movable doors are maintained as closed through the supportive effect that the springs have at the bottom of the movable doors and the inner sides of the side panels of the front cover when being pivotally disposed in the axis mounts formed at the interior of the front cover using the short axes, and are extended inward for that the breadth of the movable doors and the position of the grooves are exactly corresponded with the shape of the opening at the front cover. Therefore, the plastic housing according to the invention may satisfy requirements of various vendors in manufacturing and assembly, thereby accomplishing effects as having easy assembly, minimizing volume of plastic housings, and lowering production cost.

DESCRIPTION OF THE PREFERRED EMBODIMENTS

To better understand the features and functions of the invention, embodiments shall be described with the accompanying drawings hereunder.

Figure 3:
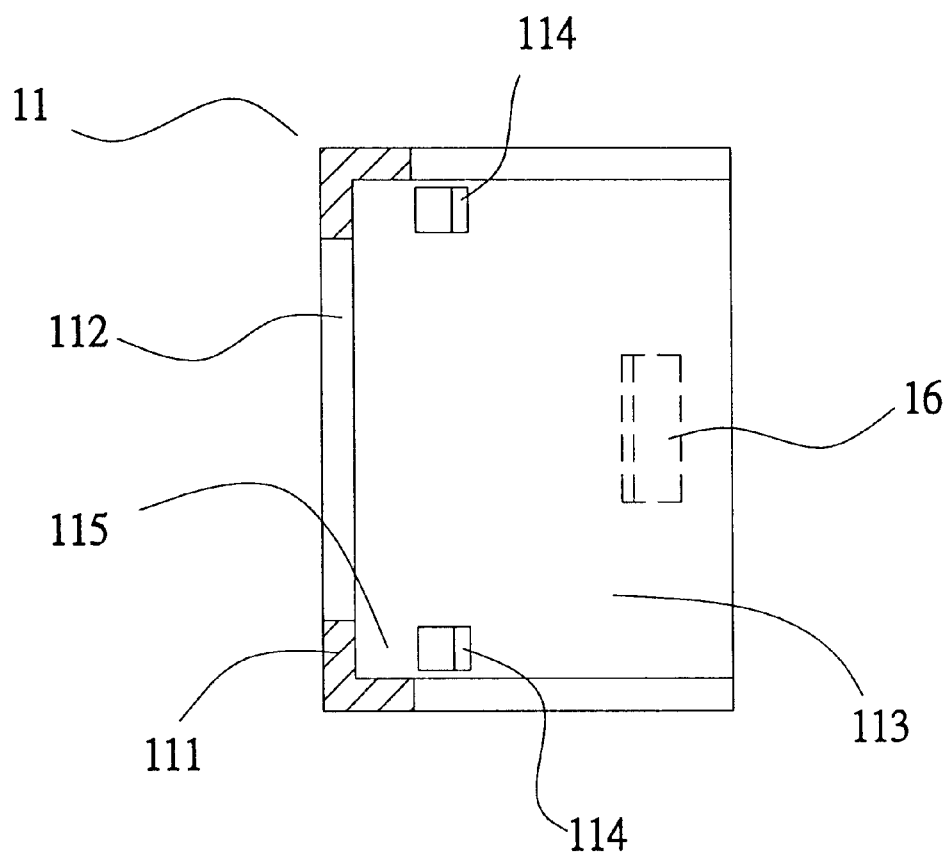
FIG. 3 shows a sectional side view before assembling the protective hood.
Figure 7:
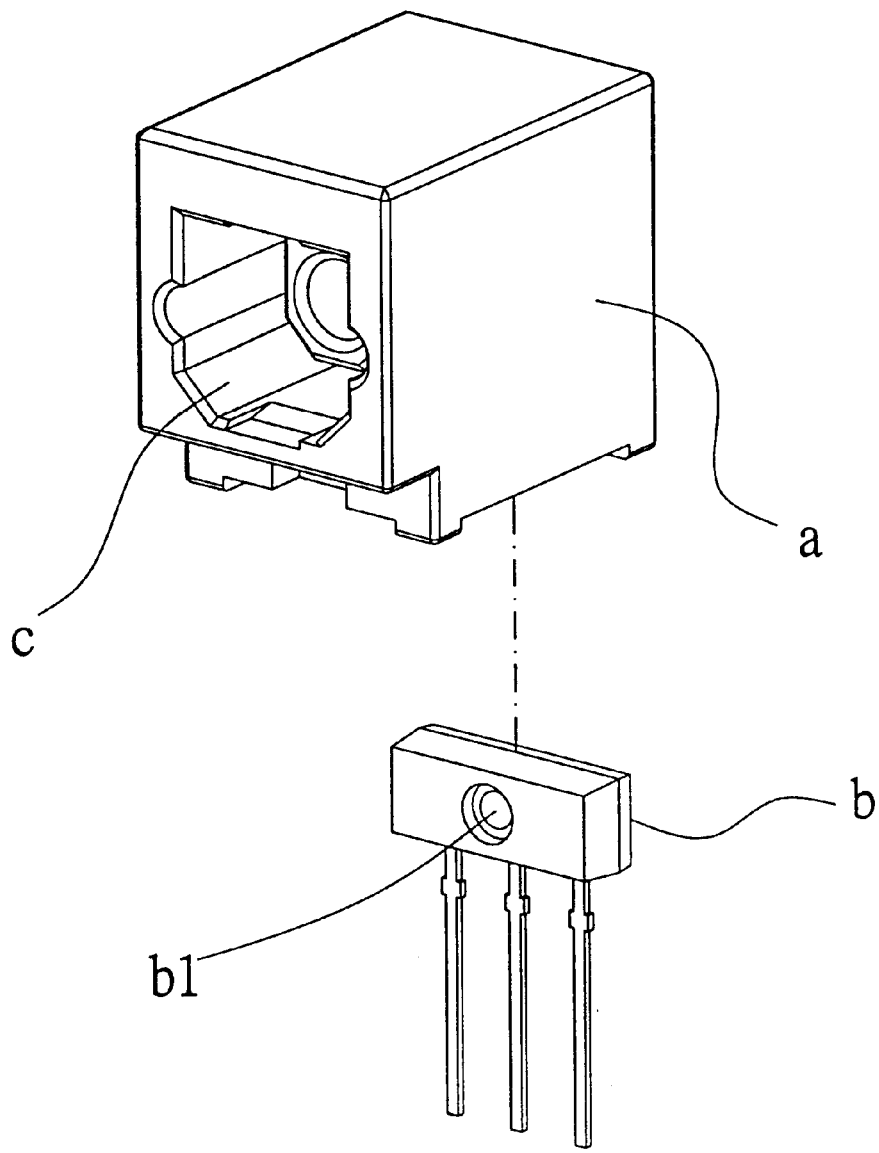
FIG. 7 shows a conventional exploded elevational view illustrating an optical fiber connector of a prior art.
Figure 8:
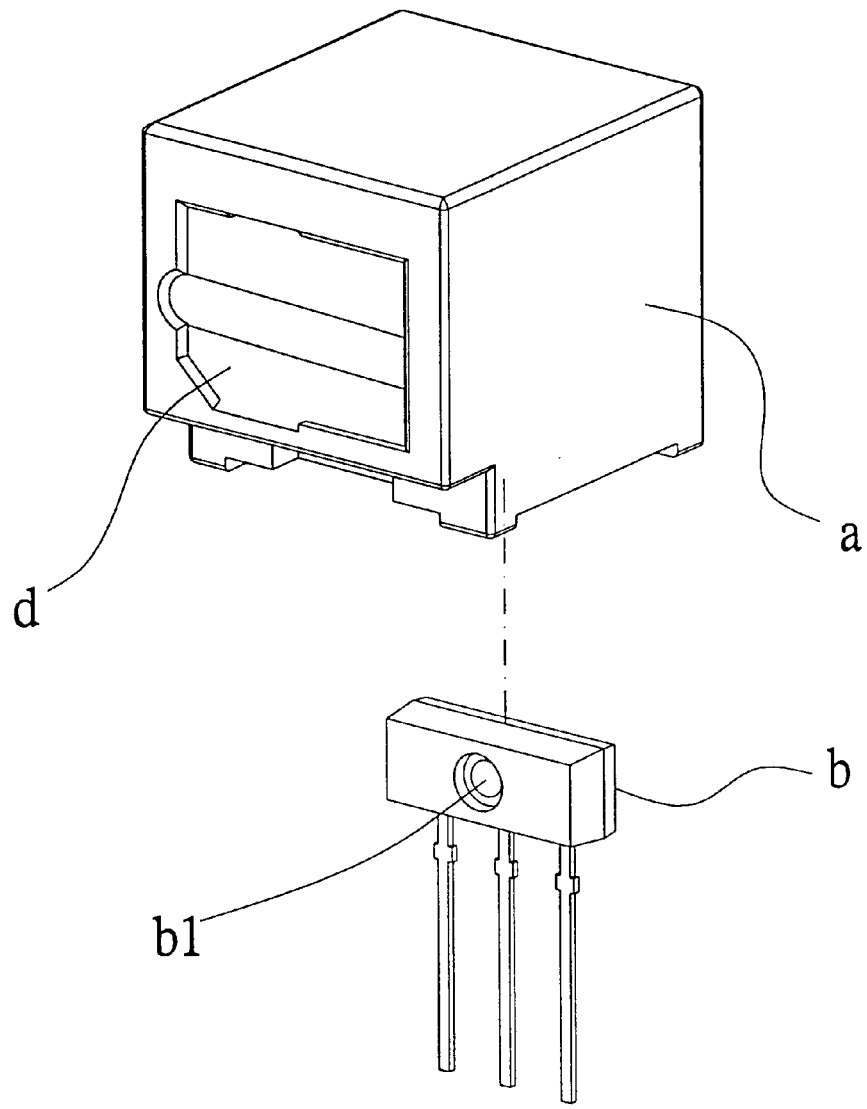
FIG. 8 shows a conventional elevational view illustrating a socket for optical fiber connector having a movable door of a prior art.

Referring to FIGS. 1 to 5, in accordance with the invention, the socket for optical fiber connector is targeted at data transmissions of video display systems, and at least comprises a plastic housing 1 and a light receiving and emitting element 2, and the features thereof being:

the plastic housing 1 having a protective hood 10 and a base 20, wherein the protective hood 10 is modularized and having a front cover 11 in form of a rectangular tray provided in the plastic housing 1; wherein a movable door 12 is pivotally disposed at two inner sides of the protective hood 10, respectively, length and width of the front cover 11 are less than those of a common plastic housing (as the housing a shown in FIG. 7), a standardized opening 112 is provided at a front panel 111 of the front cover 11, a protruding portion 114 is disposed inwardly at a bottom position at a front end of two side panels 113 of the front cover 11, respectively, such that each of the protruding portions 114 forms an axis mount 115 (as shown in FIG. 3), and an outwardly projecting interlocking portion 116 is provided at a rear end of the two side panels 113, respectively; and a movable door 12 disposed with a short axis 121 at upper and lower edges of the plastic housing 1; wherein between short axes 121 is accommodated with a spring 13, respectively, and at the center of the breadth of the movable doors 12 is transversely disposed with a groove 122, respectively, such that the movable doors 12 are maintained as closed through the supportive effect that the springs 13 have at the bottom of the movable doors 12 and the inner sides of the side panels 113 of the front cover 11 when being pivotally disposed in the axis mounts 115 formed at the interior of the front cover 11 using the short axes 121, and are extended inward for that the breadth of the movable doors 12 and the position of the grooves 122 are exactly corresponded with the shape of the opening 112 at the front cover 11.

Figure 1:
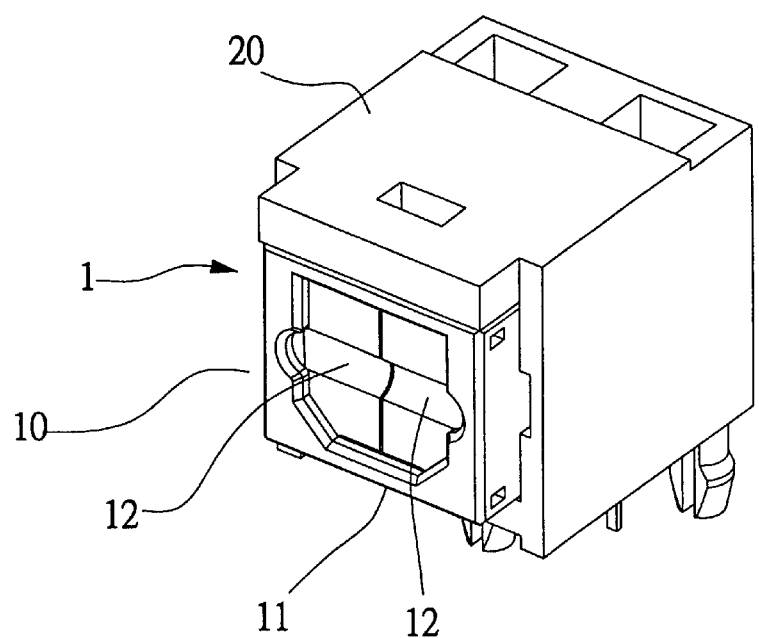
FIG. 1 shows an elevational view of an embodiment according to the invention.
Figure 2:
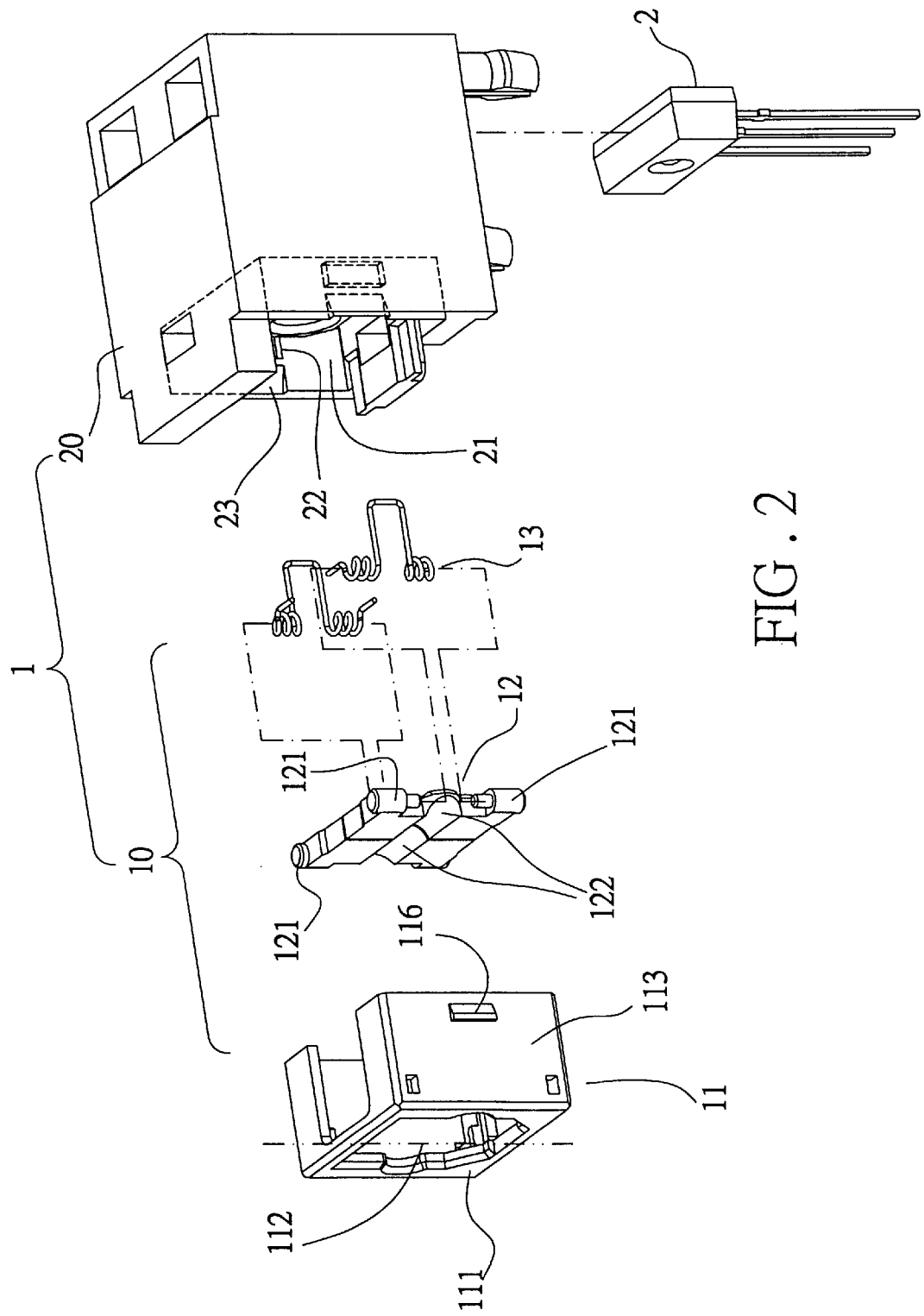
FIG. 2 shows an exploded elevational view of the embodiment according to the invention shown in FIG. 1.

Referring to FIGS. 1 and 2 showing an embodiment according to the invention, when implementing the present invention, the plastic housing 1 comprises an aforesaid protective hood 10 and a base 20. The base 20 is formed using plastic extrusion with an external size being the same as that of a plastic housing of a common socket for optical fiber connector (as indicated by the plastic housing 1 in FIG. 5), and is provided with a rectangular recess 21 at the interior thereof for accommodating the protective hood 10. Side walls within the rectangular recess 21 are disposed with an interlocking groove 22 to correspond with outwardly projecting interlocking portions 116 at the two sides of the protective hood 10, respectively, so as to achieve easy assembling of the protective hood 10 and the base 20 by fastening the interlocking portions 116 and the interlocking grooves 22 without causing an increase in the volume of the plastic housing 1. Referring to the FIGS., at locations where the base 20 leans against the front of the interlocking grooves 22 are provided with an inwardly sloped guiding track 23, respectively, such that fastening of the protective hood 10 when placed into the rectangular recess 21 is accomplished by having the interlocking portions 116 smoothly slide into the interlocking grooves 22.

Figure 4:
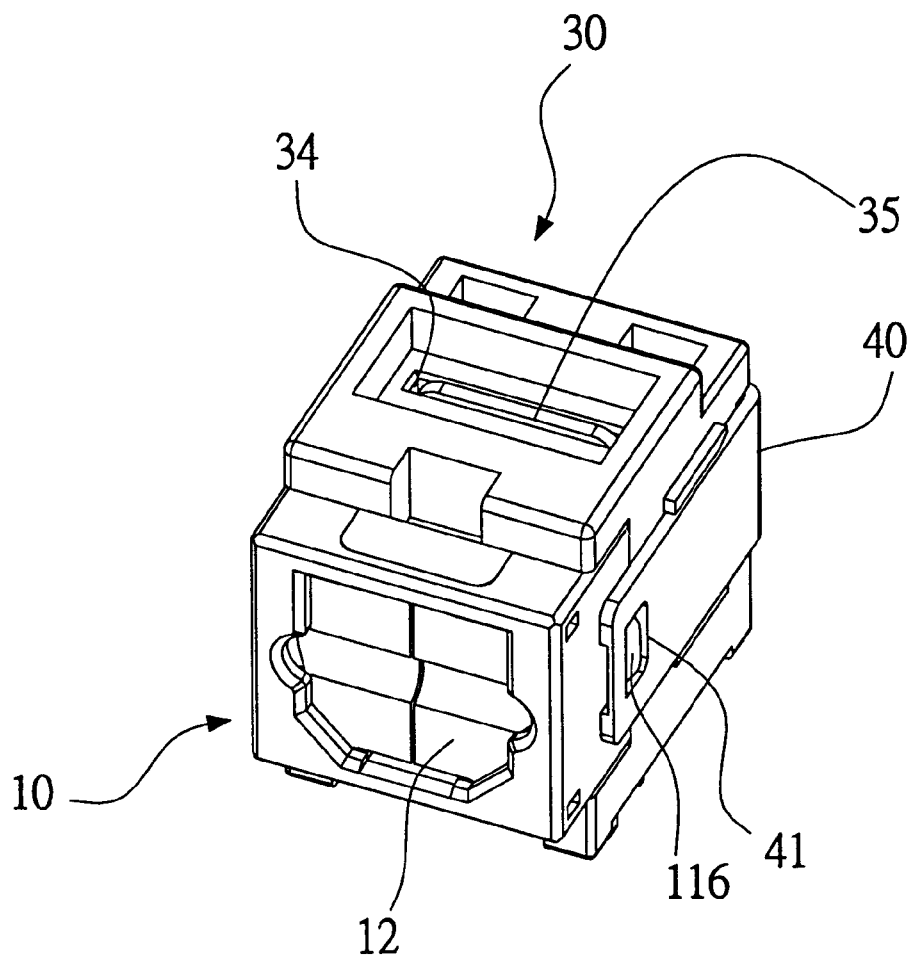
FIG. 4 shows another elevational view of an embodiment according to the invention.
Figure 5:
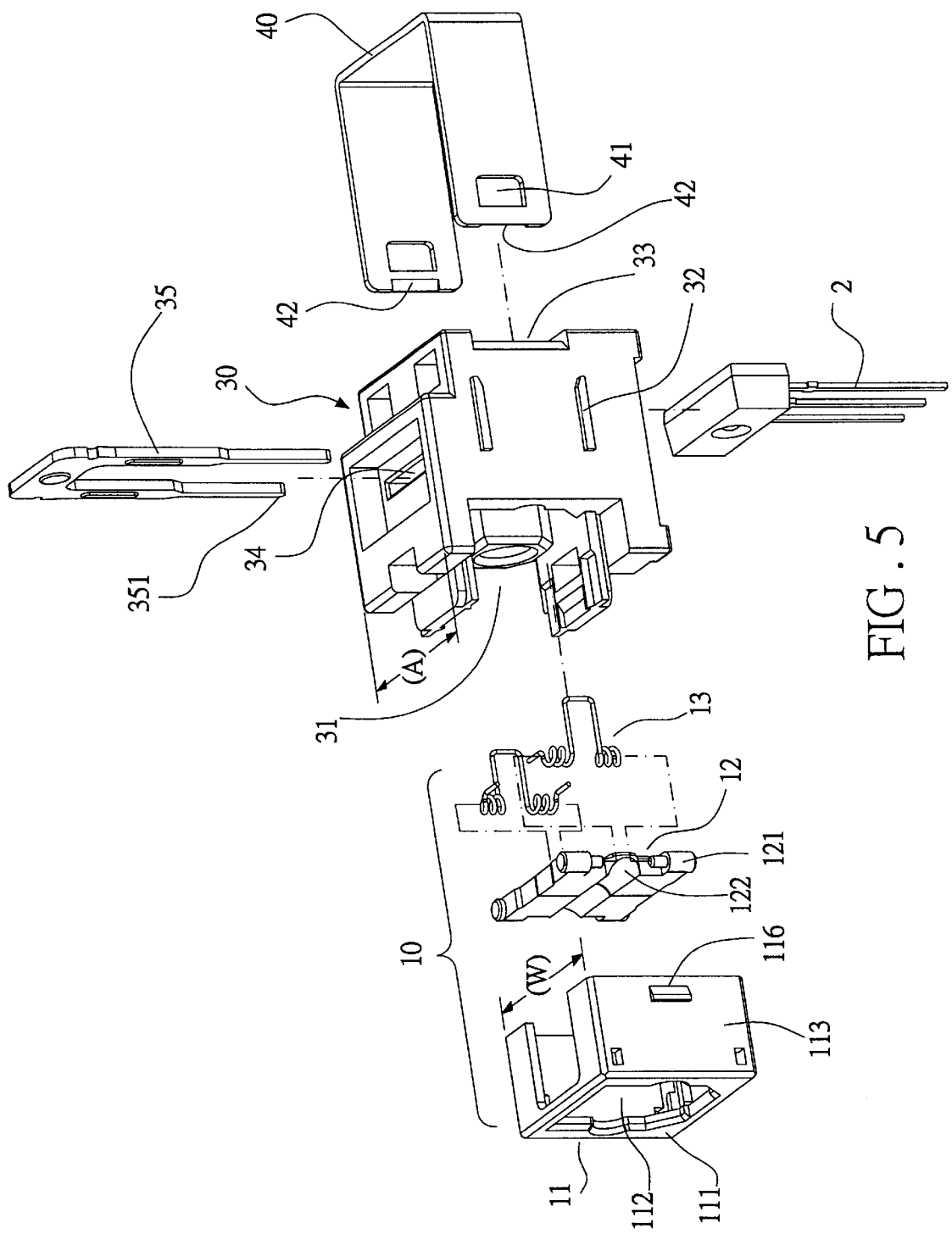
FIG. 5 shows an exploded elevational view of the embodiment according to the invention shown in FIG. 4.

Referring to another embodiment shown FIGS. 4 and 5, when implementing the invention, the plastic housing 1 further comprises the aforesaid protective hood 10, a base 30 and a U-shaped interlocking assembly 40. Wherein, the protective hood 10 is the same as that described in FIGS. 1 to 3. The base 30 is formed using plastic extrusion and an external width A thereof is the same as a width W of the front cover 11 of the protective hood 10, and at a front end of the base 30 is formed with a rectangular recess 31 for accommodating the protective hood 10. The U-shaped interlocking assembly 40 has an interlocking groove 41 at two sides thereof to corresponding with the projecting interlocking portions 116, respectively, so as to achieve easy assembling of the protective hood 10 and the base 30 by fastening the interlocking grooves 41 of the U-shaped interlocking assembly 40 with the interlocking portions 116 of the protective hood 10 while being able to minimize the volume of the plastic housing 1 as an advantage.

Referring to FIG. 5, in accordance with the invention, at two side walls of the base 30 are disposed with upper and lower ribs 32 that are parallel, respectively, and at rear corners of the base 30 are provided with a notched passage 33, respectively, so as to reinforce stability of the invention after being assembled by having the ribs 32 and the notched passages 33 accommodate the U-shaped interlocking assembly 40. In addition, at locations where the interlocking assembly 40 leans against the front of the interlocking grooves 41 are provided with inwardly sloped guiding tracks 42, such that fastening of the protective hood 10 and the base 30 is accomplished by having the interlocking grooves 41 of the U-shaped assembly 40 smoothly slide into the projecting interlocking portions 116 of the protective hood 10. Furthermore, according to the embodiment, at the center of the base 30 is provided with a long and thin tunnel 34 that penetrates through from the top to the bottom of the base 3 for vertically inserting a U-shape pillar 35. A foot end 351 of the inserted U-shaped pillar 35 then reaches to the bottom of the base 30 and is welded onto a circuit board, so as to replaced plastic feet used common fastening methods; above all, this structure may also be applied to the embodiment shown in FIG. 1.

According to the aforesaid structure, during manufacturing and assembly of the structure, the protective hood 10 may be separately fabricated from the other components namely the base 20, 30, and the light receiving and emitting element 2. Therefore, mass production and modularization of the protective hood 10 are made possible for adapting the base 20 or 30 having various designs, thereby accomplishing the purposes of having easy assembly, low production cost and minimized external size of the plastic housing 1.

Figure 6:
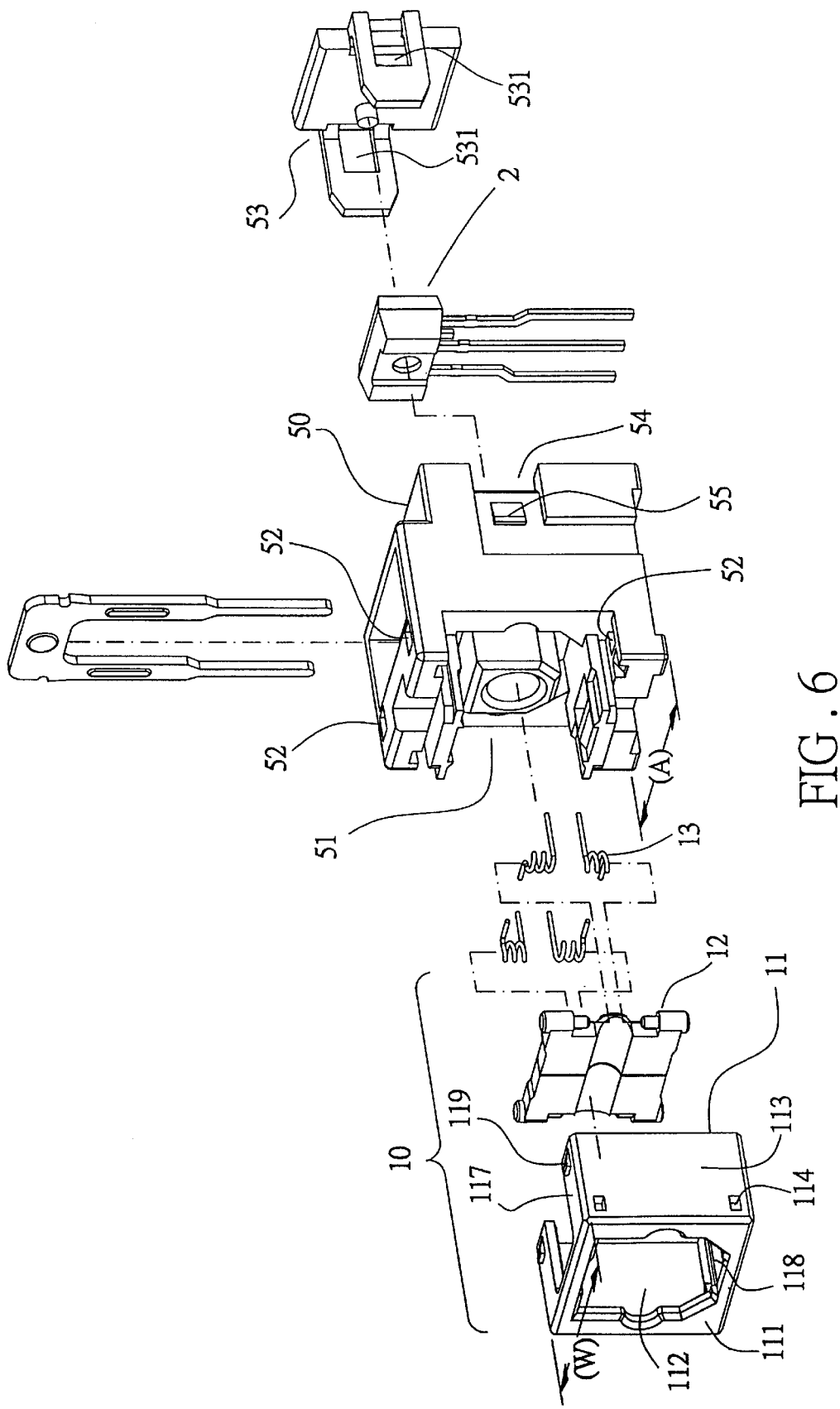
FIG. 6 shows an elevational view of yet another embodiment according to the invention.

Referring to FIG. 6 showing an exploded elevational view illustrating another embodiment according to the invention, a plastic housing 1 according to the embodiment comprises a protective hood 10 and a base 50, wherein the protective hood 10 is similarly comprised of a front cover 11, two movable doors 12 that open in opposite directions, and springs 13. At corners approaching rear ends of a top panel 117 and a bottom panel 118 of the front cover 11 are disposed with two projecting interlocking portions 119 having outward hooks, respectively. The base 50 is formed using plastic extrusion, and an external width A thereof is the same as the width W of the front cover 11 of the protective hood 10, and at a front end of the base 30 is formed with a rectangular recess 51 for accommodating the protective hood 10. At upper and lower edges of side walls of the rectangular recess 51 are provided with interlocking grooves 52 for corresponding with interlocking portions 119 at the front cover 11, respectively, so as to have the protective hood 10 assemble and fix into the rectangular recess 51 of the base 50.

In addition, the light receiving and emitting element 2 of the embodiment may be designed as placed in from the rear of the base 50, fixed and sealed using a rear cover 53. Referring to FIG. 6, at locations approaching rear edges of two side walls of the base 50 are disposed with a groove 54, respectively, and at an appropriate position of each of the grooves 54 is provided with a projecting interlocking portion 55. The rear cover 53 is U-shaped and has an interlocking groove 531 at two side walls thereof for corresponding with the projecting interlocking portions 55 at the two sides of the base 50, respectively, so as achieve effects as having easy assembly and minimized volume by interlocking and fastening the light receiving and emitting element 2 in the base 50.

Conclusive from the above, the invention has succeeded in providing easy assembly, lowering production cost and minimizing volume of plastic housings. It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A socket for optical fiber connector used in data transmission of video display systems, at least comprising a plastic housing and a light receiving and emitting element; and the features thereof being:

the plastic housing having a protective hood and a base, wherein the protective hood is modularized and having a front cover in form of a rectangular tray provided in the plastic housing; a movable door is pivotally disposed at two inner sides of the protective hood 10, respectively, inside the plastic housing being provided with a modularized protective hood further comprising a front cover having a rectangular recess and a movable door pivotally disposed at two inner sides thereof, respectively, and a length and a width of the front cover being less than those of prior plastic housings, at a front panel of the front cover being provided with a standardized opening, a protruding portion being disposed at upper and lower positions approaching front edges of two side panels of the front cover, respectively, such that each of the protruding portions forms an axis mount, and an outwardly projecting interlocking portion being provided at a rear end of the two side panels, respectively;

each of the movable doors being disposed with a short axis at upper and lower edges thereof, wherein between short axes being accommodated with a spring, respectively, and at the center of the breadth of each movable door being transversely disposed with a groove; and the movable doors being maintained as closed through the supportive effect that the springs provides at the bottom of the movable doors and the inner sides of the side panels of the front cover when being pivotally disposed in the axis mounts formed at the interior of the front cover using the short axes, and being extended inward for that the breadth of the movable doors and the position of the grooves being exactly corresponded with the shape of the opening at the front cover.

2. The socket for optical fiber connector according to claim 1, wherein the front cover of the modularized protective hood is provided with a projecting interlocking portion at a rear end of the two side panels, respectively.

3. The socket for optical fiber connector according to claim 1, wherein the base is formed using plastic extrusion, has an external size thereof same as that of a common socket for optical fiber connector, and is provided with a rectangular recess at the interior thereof for accommodating the protective hood; and at internal walls of the rectangular recess are disposed with a plurality of interlocking grooves for corresponding with the projecting interlocking portions at the front cover of the protective hood, so as to fasten the protective hood and the base using the interlocking portions and the interlocking grooves.

4. The socket for optical fiber connector according to claim 3, wherein locations where the base leans against the front of the interlocking grooves are provided with inwardly sloped guiding tracks.

5. The socket for optical fiber connector according to claim 1, the plastic housing comprising a U-shaped interlocking assembly, wherein external width of the base is same as width of the front cover of the protective hood, and at a front end of the base is formed with a rectangular recess for accommodating the protective hood; the front cover of the modularized protective hood is provided with a projecting interlocking portion at a rear end of the two side panels, respectively and the U-shaped interlocking assembly has an interlocking groove at two sides thereof for corresponding with the projecting interlocking portions, so as to assemble the protective hood and the base by fastening the interlocking grooves of the U-shaped interlocking assembly to the interlocking portions of the protective hood.

6. The socket for optical fiber connector according to claim 5, wherein two side walls of the base are disposed with upper and lower ribs that are parallel, respectively, and rear corners of the base are provided with a notched passage, respectively, so as to accommodate the U-shaped interlocking assembly using the ribs and the notches passages.

7. The socket for optical fiber connector according to claim 5, wherein locations where the U-shaped interlocking assembly leans against the front of the interlocking grooves are provided with inwardly sloped guiding tracks.

8. The socket for optical fiber connector according to claim 5, wherein the front cover of the modularized protective hood having two projecting interlocking portions disposed at corners approaching rear ends of a top panel and a bottom panel respectively; interlocking grooves are disposed at upper and lower edges of side walls of he rectangular recess of the base, corresponding with interlocking portions at the front cover.

9. The socket for optical fiber connector according to claim 1, wherein the base further includes a light receiving and emitting element at a rear end of the base, at locations approaching rear edges of two side walls of the base are disposed with a groove, respectively, and at an appropriate position of each of the grooves 53 is provided with a projecting interlocking portion 55; and a U-shaped rear cover provided has an interlocking groove at two side walls thereof for corresponding with the projecting interlocking portions at the two sides of the base for further fastening, respectively.

10. The socket for optical fiber connector according to claim 1, wherein the a center of the base is provided with a long and thin tunnel that penetrates through from the top to the bottom of the base for vertically inserting a U-shape pillar, and an foot end of the inserted U-shaped pillar then reaches to the bottom of the base and is welded onto a circuit board.

* * * * *